United States Patent [19]
Schmidt

[11] Patent Number: 5,854,570
[45] Date of Patent: Dec. 29, 1998

[54] FEEDBACK-FREE METHOD FOR THE DEMODULATION OF HIGHER-LEVEL MQAM SIGNALS WITHOUT KNOWLEDGE OF THE TRANSMITTED SYMBOLS

[75] Inventor: Kurt Schmidt, Grafing, Germany

[73] Assignee: Rohde & Schwarz, GmbH & co., Munich, Germany

[21] Appl. No.: 918,958

[22] Filed: Aug. 26, 1997

[30] Foreign Application Priority Data

Aug. 31, 1996 [DE] Germany ............ 196 354 444.7

[51] Int. Cl.⁶ ............... H03D 3/00; H04L 27/38
[52] U.S. Cl. .......... 329/304; 329/306; 375/264; 375/324; 375/329
[58] Field of Search ............ 329/304–310; 375/261–267, 324, 325, 341

[56] References Cited

U.S. PATENT DOCUMENTS 5,150,383  9/1992  Misaizu et al. ............ 375/94
5,594,759  1/1997  Iwamatsu ............ 375/344

FOREIGN PATENT DOCUMENTS 43 06 881  6/1994  Germany.
44 10 607  3/1995  Germany.
44 46 637  6/1996  Germany.

OTHER PUBLICATIONS

"A New Carrier Regeneration Scheme for QAM Signals," Hoffmann, IEEE International Symposium on Circuits and Systems, Finland, Jun. 1988, pp. 599–602.

*Primary Examiner*—David Mis
*Attorney, Agent, or Firm*—Hill & Simpson

[57] ABSTRACT

For demodulation of higher-level MQAM signals without knowledge of the transmitted symbols, the clock phase error is calculated first after the sampling of the baseband signal with a clock frequency corresponding to the MQAM signal, and the corresponding time shift of the baseband signal is compensated therewith by interpolation (clock synchronization). Subsequently, the carrier frequency deviation and the carrier phase deviation are calculated feedback-free according to the principle of the maximum likelihood theory using Fourier transformation or by convolution in the time domain, and thus the data sequence is compensated.

6 Claims, 8 Drawing Sheets

FIG. 17

FEEDBACK-FREE METHOD FOR THE DEMODULATION OF HIGHER-LEVEL MQAM SIGNALS WITHOUT KNOWLEDGE OF THE TRANSMITTED SYMBOLS

BACKGROUND OF THE INVENTION

1. Field of the Invention

The present invention is directed to a method for demodulating higher-level NQAM signals, and in particular to a method for demodulating such signals without the use of feedback and without knowledge of the transmitted symbols.

2. Description of the Prior Art

For demodulation of higher-level higher-stage QAM (Quadrature Amplitude Modulated) signals (for example, 4, 16, 32, 64, 128, 256 QAM signals), the received high-frequency signals are converted into the baseband at the reception side with an oscillator whose heterodyne frequency corresponds to the carrier frequency of the transmission side. These baseband signals are then sampled with a clock frequency that is predetermined by the QAM modulation method that is employed. Previously known demodulation methods for such MQAM signals work with control circuits with which the frequency and phase of the heterodyne oscillator is exactly regulated to the frequency and phase of the carrier of the transmission side (German OS 43 06 881, German OS 44 10 607 and German OS 44 46 637). Via a phase detector, a clock signal that is in proper phase relation is then derived from the baseband signals converted in this way into the baseband via a controlled oscillator, the baseband signals being respectively sampled exactly at the predetermined symbol times with this clock signal (according, for example, to Hoffmann, "A new carrier regeneration scheme for QAM signals", IEEE International Symposium on Circuits and Systems, Finland, June 88, pp. 599–602).

These known demodulation methods have the disadvantage of a relatively long acquisition time that can even lead to what is referred to as a hangup in the extreme case. They can only be utilized for very long symbol sequences wherein the acquisition time plays a subordinate part. These known methods are not suitable for what are referred to as TDMA transmission (Time Division Multiple Access) with very short symbol sequences.

SUMMARY OF THE INVENTION

It is therefore an object of the invention to create a demodulation method for such MQAM signals with which a fast synchronization can also be carried out for short symbol sequences without knowledge of the transmitted symbols.

The above object is achieved in accordance with the principles of the present invention in a method for demodulating higher-level MQAM signals without knowledge of the transmitted symbols by sampling the baseband signal with a clock frequency corresponding to the MQAM signal, and first estimating (calculating) the clock phase error and compensating the corresponding time shift of the baseband signal by interpolation using this estimated clock phase error (clock synchronization), and subsequently calculating the carrier frequency offset and the carrier phase offset feedback-free according to maximum likelihood theory and using Fourier transformation or by convolution in the time domain, and thereby compensating the data sequence.

The inventive method enables a fast synchronization of the received QAM signals purely analytically without regulation. The acquisition time is thus exactly defined, and what are referred to as hangups cannot occur. Moreover, knowledge of the transmitted symbols is not necessary. In the inventive method, the synchronization parameters such as clock, phase, carrier frequency offset and carrier phase offset are purely analytically calculated, namely with extremely little calculating outlay. A fundamental difference over known demodulation methods is comprised therein that the heterodyne oscillator for reconversion into the baseband is no longer regulated to the rated value with respect to frequency and phase; rather, a heterodyne oscillator exactly set to the carrier frequency to a few percent of the symbol rate is employed, whereas a potential frequency and phase error is taken into consideration purely computationally by corresponding compensation of the baseband signals. The same applies to the free-wheeling clock generator, whose clock frequency is selected according to MQAM method applied, and a potential error in clock phase is not levelled but in turn eliminated by corresponding compensation of the baseband signals. A synchronization in the shortest time in an observation interval of only 200 symbol periods is possible even given a 256 QAM modulation. An inventive method is therefore especially suitable for the demodulation of TDMA transmission methods with only short symbol sequences within a burst.

The inventive technique applied, in an embodiment, to the carrier for estimating the frequency and phase offset is suitable not only for this purpose but could also be utilized for other purposes, for example for estimating the frequency of a disturbed sine signal having an unknown frequency.

DESCRIPTION OF THE PREFERRED EMBODIMENTS

Figure 1:
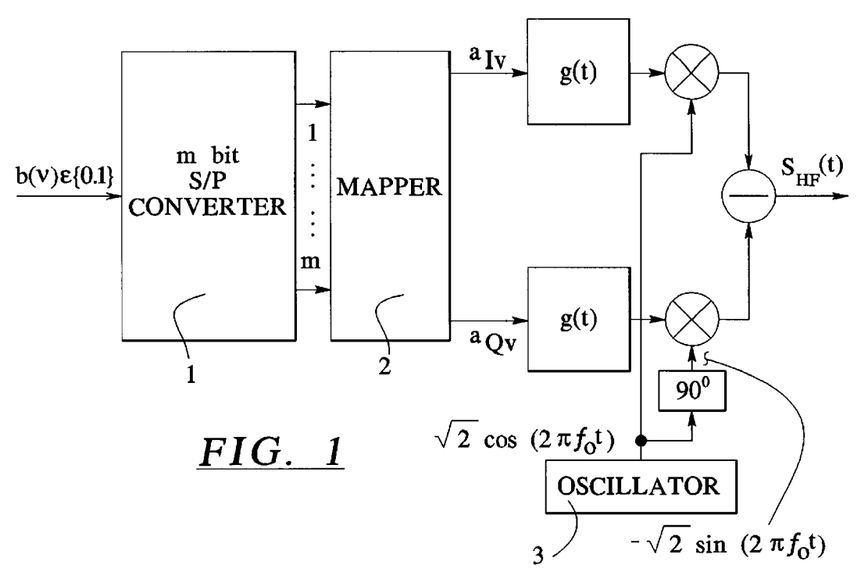
FIG. 1 is a block diagram showing the transmitter-side editing of a MQAM signal

FIG. 1 schematically shows the transmitter-side editing of a MQAM signal. In a serial-to-parallel converter 1, several m-bits of the serial data stream to be transmitted are merged to form a more significant complex symbol. The complex signal space comprises M elements. Complex symbol words with real part and imaginary part are generated in this way in the mapper 2, these being subsequently united to form the transmittable MQAM high-frequency signal by the carrier frequencies of a carrier generator 3 that are phase-shifted by 90° relative to one another.

Figure 2:
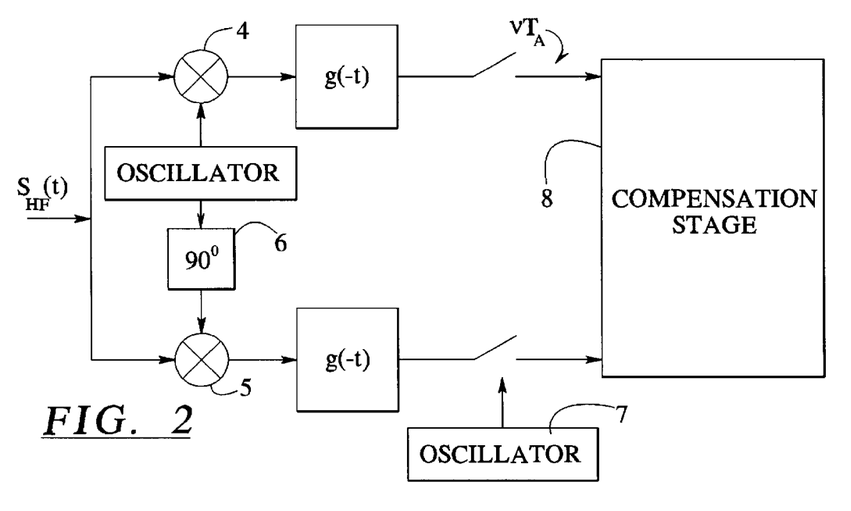
FIG. 2 is a diagram of the associated quadrature receiver for use with the transmitter of FIG. 1.

FIG. 2 shows the appertaining quadrature receiver.

The received MQAM high-frequency signal is again mixed down into the baseband in two mixers 4 and 5 with the heterodyne frequencies of a carrier oscillator 6 phase-shifted by 90° relative to one another, and the baseband signals is subsequently sampled with a clock generator 7 whose clock frequency corresponds to the clock frequency of the respectively applied MQAM method. The sampling rate must be selected high enough that the sampling theorem is satisfied.

By contrast to known demodulation methods, the oscillator 6 is no longer readjusted to the exact carrier frequency and carrier phase value according to the invention; rather, the oscillator 6 is only set exactly in frequency to the transmitter-side carrier frequency to a few percent of the symbol rate. The clock generator 7 is also not regulated in phase; only the clock frequency is set to the value of the MQAM method applied. According to the invention, the clock phase error that still exists is compensated by a subsequent calculating process, as is the frequency and phase error of the carrier potentially existing due to the unregulated oscillator 6. This compensation of the baseband signals ensues in a compensation stage 8 whose function and operation are described in greater detail below.

Figures 3, 4:
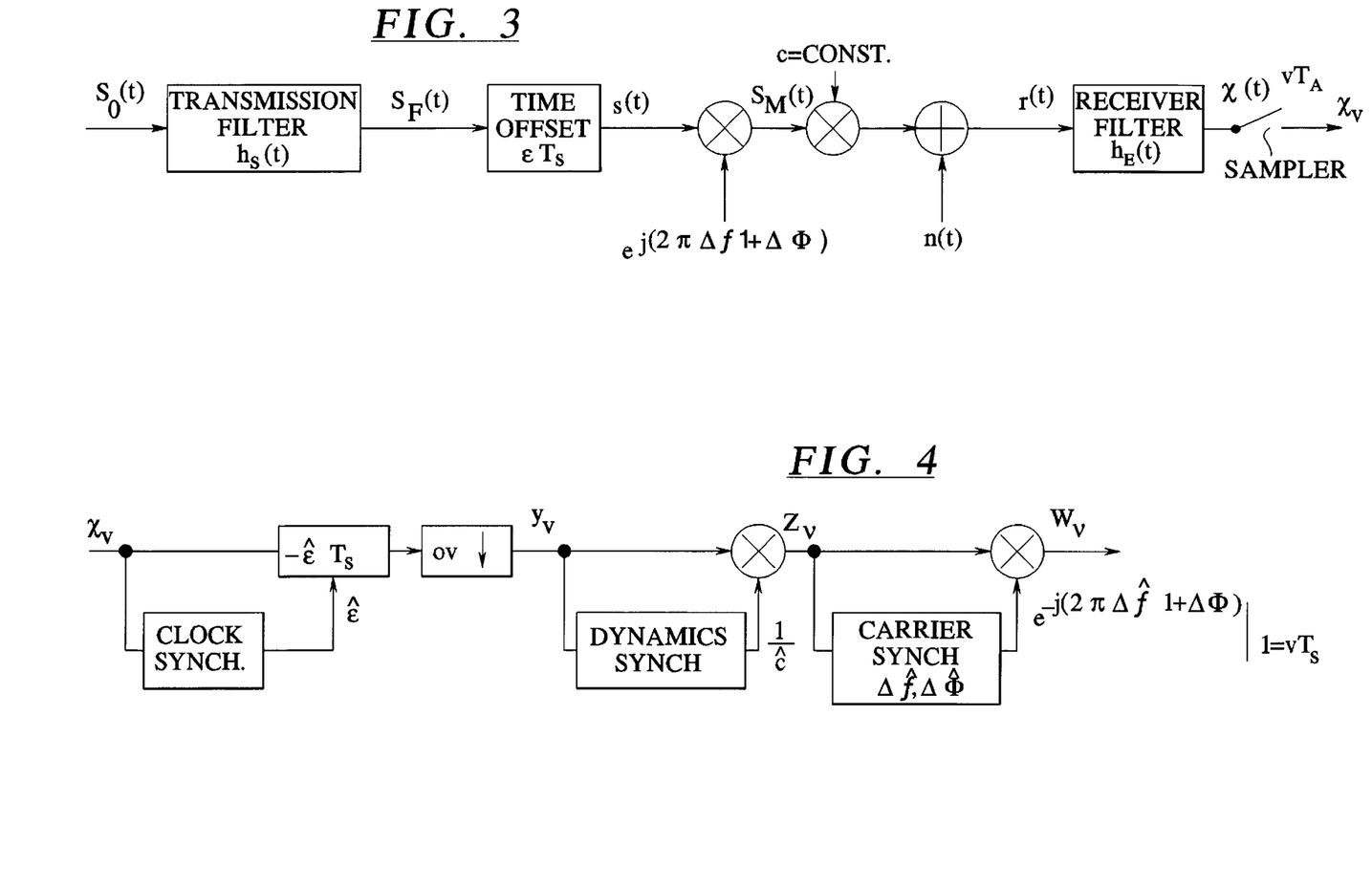
FIG. 3 is a block diagram illustrating a transmission model in the equivalent baseband presentation for the transmitter/receiver arrangement of FIGS. 1 and 2, in accordance with the principles of the inventive method.
FIG. 4 is a block diagram illustrating the synchronization which takes place in the inventive method.

FIG. 3 shows the transmission model described with reference to FIGS. 1 and 2 in the equivalent baseband presentation.

The point of departure is the digital complex signal sequence $s_O(t)$ to be transmitted $$s_0(t) = \sum_{\nu=-\infty}^{\infty} a_\nu T_s \delta(t - \nu T_s)$$

This signal can be presented as the sum of two dirac pulses weighted with the symbol values $a_{I,\nu}$, $a_{Q,\nu}$ at the times $t=\nu \cdot T_s$ in real and imaginary part. The MQAM symbols $$a_\nu = a_{I,\nu} + j a_{Q,\nu}$$

can, as already mentioned, assume the values $a_{I,\nu}$, $a_{Q,\nu} \in \{\pm 1, \pm 3, \pm 5, \ldots\}$. The signal $s_F(t)$ following the transmission filter derives by convolution of $s_O(t)$ with the pulse response $h_s(t)$:

$$\begin{aligned} s_F(t) &= s_0(t) * h_s(t) \\ &= \sum_{\nu=-\infty}^{\infty} a_{I,\nu} T_s h_s(t - \nu T_s) + j \sum_{\nu=-\infty}^{\infty} a_{Q,\nu} T_s h_s(t - \nu T_s) \end{aligned}$$

The time offset $\epsilon T_s$ (unknown in the receiver) compared to the ideal sampling times is realized by the following system block. The values thereby lies in the range $-0.5 \leq \epsilon < 0.5$ For s(t) one obtains $$s(t) = \sum_{\nu=-\infty}^{\infty} a_{I,\nu} T_s h_s(t - \epsilon T_s - \nu T_s) + j \sum_{\nu=-\infty}^{\infty} a_{Q,\nu} T_s h_s(t - \epsilon T_s - \nu T_s)$$

The occurring frequency offset $\Delta f$ and phase offset $\Delta \Phi$ in the demodulation are taken into consideration with the rotation pointer $e^{j(2\pi \Delta f t + \Delta \Phi)}$.

In this way, the transmission signal $s_M(t)$ in the equivalent baseband derives as $s_M(t) = s(t) \cdot e^{j(2\pi \Delta f t + \Delta \Phi)}$.

The transmission signal $s_M(t)$ is disturbed on the transmission path by additive white Gaussian noise (AWGN) n(t) the reception signal r(t)

$$r(t) = s_M(t) + n(t)$$

arises.

Given the QAM transmission under consideration, the noise $n(t) = n_I(t) + j n_Q(t)$ is complex in value. The real part $n_I(t)$ and the imaginary part $n_Q(t)$ have the two-sided power density spectrum (LDS) $N_0/2$ and are statistically independent of one another. The average power of the transmitted signal $s_M(t)$ yields $$P_s = \overline{E\{|s_M(t)|^2\}} = \frac{1}{T_s} \int_0^{T_s} E\{|s_M(t)|^2\} dt$$

since the anticipation value is time-dependent and periodic with $T_s$. The average symbol energy of the transmission signal is calculated as $$E_s = P_s \cdot T_s = \overline{E\{|s_M(t)|^2\}} \cdot T_s = \int_0^{T_s} E\{|s_M(t)|^2\} dt$$

The output sequence $x_\nu$ shown in FIG. 1 is present with an oversampling factor of $ov = T_s/T_A$, whereby $T_s$ describes the symbol period and $T_A$ describes the sampling period. According to FIG. 4, the synchronization is divided into three stages:

A. clock synchronization

B. dynamics estimation

C. carrier synchronization

A. Clock Synchronization

The sequence $x_\nu$ (also see FIG. 1) is employed first for estimating the clock phase of the unknown normed time offset $\epsilon$. The method for clock synchronization is feedback-free and known (K. Schmidt: Digitale Taktrückgewinnung für bandbreiteneffiziente Mobilfunksysteme, Dissertation, Inst. für Nachrichtentechnik, Darmstadt, December. 1993 and Oerder: Algorithmen zur digitalen Taktsynchronisation bei Datenübertragung, Lehrstuhl für Elektrische Regelungstechnik, Aachen, 1989). Subsequently, the estimated time shift $\hat{\epsilon} T_s$ (the caret is generally employed given estimated values) is in turn cancelled by an interpolation filter. Subsequently, an undersampling is made by the oversampling factor ov so that the sequence $w_v$ represents the samples still phase-rotated at the symbol times. By evaluating the amount information, the dynamics estimate of the unknown coefficients c (see FIG. 1) is subsequently implemented and the multiplication is in turn cancelled with the estimated value ĉ. The sequence $Z_v$ that has arisen is subsequently employed for frequency and phase estimation. The sequence $w_v$, arises after the frequency and phase compensation implemented with the estimated values, this being equal to the transmitted symbol sequence $a_v$ in the ideal case. Basic observations about the compensation can be found in (K. Schmidt: "Digitale Taktrückgewinnung für bandbreiteneffiziente Mobilfunksysteme", Dissertation, Inst. für Nachrichtentechnik, Darmstadt, December 1993 and Kammeyer: "Nachrichtenübertragung", Teubner-Verlag, Stuttgart, 1992).

An observation interval of N symbol periods is assumed in all estimations.

B. Dynamics Estimation

Dynamics estimation is necessary because an information is contained both in the symbol phase as well as in the symbol amount in a MQAM transmission. The dynamics estimation is implemented in up to three stages:

1. Pre-estimation: Initially, a first, rough estimate of the dynamics is analytically implemented by comparing the calculated average value of the useful signal amount to the statistical average value of the symbol amount of the corresponding MQAM modulation.
2. Rough estimation: Subsequently, the multiplicative constant to be estimated is varied by a search method and that constant is selected that maximizes the log likelihood function. This method for dynamics estimation can also be interpreted as correlation of the distribution density function of the received signal amounts with the static distribution density function of the symbol amounts.
3. Fine Estimation: Proceeding from this value, the fine estimation value is subsequently analytically calculated based on the maximum likelihood theory.

The number of stages employed is dependent on the desired precision. Given a great observation length N, for example, only the pre-estimation suffices, whereas all three stages are necessary given a short observation length and a high number of steps M=256.

Pre-Estimation

First, a first estimate of the dynamics is implemented by comparing the average useful signal amount to the ideal anticipation value of the symbol amount of a corresponding MQAM constellation. With M different symbols $A_\alpha$ of an MQAM symbol alphabet, the ideal anticipation value $Betr_{id}$ of the symbol amounts is calculated as:

$$Betr_{id} = \frac{1}{M} \sum_{\alpha=1}^{M} |A_\alpha|$$

In detail, the following values derive for the different modulation levels:

| | $Betr_{id}$ |
|---|---|
| 16QAM | 2,9954 |
| 32QAM | 4,2302 |
| 64QAM | 6,0869 |
| 128QAM | 8,5315 |
| 256QAM | 12,2253 |

The estimated amount derives from the N values by $$Betr_{sch\ddot{a}iz} = \frac{1}{N} \sum_{v=0}^{N-1} |x_v|$$

The estimated value $\hat{c}_1$ of the first stage thus yields the pre-estimation value according to Equation $$\hat{c}_1 = \frac{Betr_{sch\ddot{a}iz}}{Betr_{id}} = \frac{\frac{1}{N} \sum_{v=0}^{N-1} |x_v|}{Betr_{id}}$$

Rough Estimation

The method of rough estimation is developed based on the maximum likelihood theory. The principle of estimating dynamics is based on the correlation of the relative frequency of the read-in symbol amounts with the distribution density function of an ideal MQAM signal.

The point of departure is the following approach for the maximum likelihood function. A limited number of symbols is assumed given an unlimited observation duration. The anticipation value should be maximized over the entire observation sequence.

$$L(\hat{c}) = E_{a_v} \left\{ e^{-\frac{1}{N_0} \int_{-\infty}^{\infty} |r(t)-\hat{c}s(t)e^{j(2\pi\Delta ft+\Delta\Phi)}|^2 dt} \right\} \quad (2)$$

$$= E_{a_v} \left\{ e^{-\frac{1}{N_0} \int_{-\infty}^{\infty} [|r(t)|^2 - 2\hat{c}Re\{r(t)s^*(t)e^{-j(2\pi\Delta ft+\Delta\Phi)}\} + \hat{c}^2|s(t)|^2] dt} \right\}$$

Since the estimation parameter is not contained r(t) can be omitted and an expansion made instead with $T_s \cdot |x_v|^2$. With the normalization.

$$\int_{-\infty}^{\infty} h_s^2(t) dt = h_{ges}(0) = \frac{1}{T_s}$$

and after the intermediate calculation $$\int_{-\infty}^{\infty} \sum_v \sum_\mu T_s^2 a_v a_\mu^* h_s(t-vT_s) h_s(t-\mu T_s) dt = \sum_v \sum_\mu T_s^2 a_v a_\mu^* \underbrace{h_{ges}((v-\mu)T_s)}_{= \begin{cases} 1 \text{ for } v = \mu \\ 0 \text{ for } v \neq \mu \end{cases}}$$

$$\underbrace{}_{|s(t)|^2}$$

the expression $$L(\hat{c}) = E_{a_v} \left\{ e^{-\frac{T_s}{N_0} \sum_v [|x_v|^2 - 2\hat{c}Re\{x_v a_v^* e^{-j(2\pi\Delta f v T_s+\Delta\Phi)}\} + \hat{c}^2|a_v|^2]} \right\}$$

derives.

The exponent can now be combined and one obtains $$L(\tilde{c}) = E_{a_v}\left\{ e^{-\frac{T_s}{N_0}\sum_v |x_v - \tilde{c}a_v e^{-j(2\pi\Delta fvT_s+\Delta\Phi)}|^2} \right\}$$

$$= E_{a_v}\left\{ \prod_v e^{-\frac{T_s}{N_0}|x_v - \tilde{c}a_v e^{-j(2\pi\Delta fvT_s+\Delta\Phi)}|^2} \right\}$$

Since the individual symbols $a_v$ are statistically independent of one another, the product can be executed after the formation of the anticipation value.

$$L(\tilde{c}) = \prod_v E_{a_v}\left\{ e^{-\frac{T_s}{N_0}\left| \underbrace{x_v - \tilde{c}a_v e^{j(2\pi\Delta fvT_s+\Delta\Phi)}}_{e_v} \right|^2} \right\}$$

Figure 5:
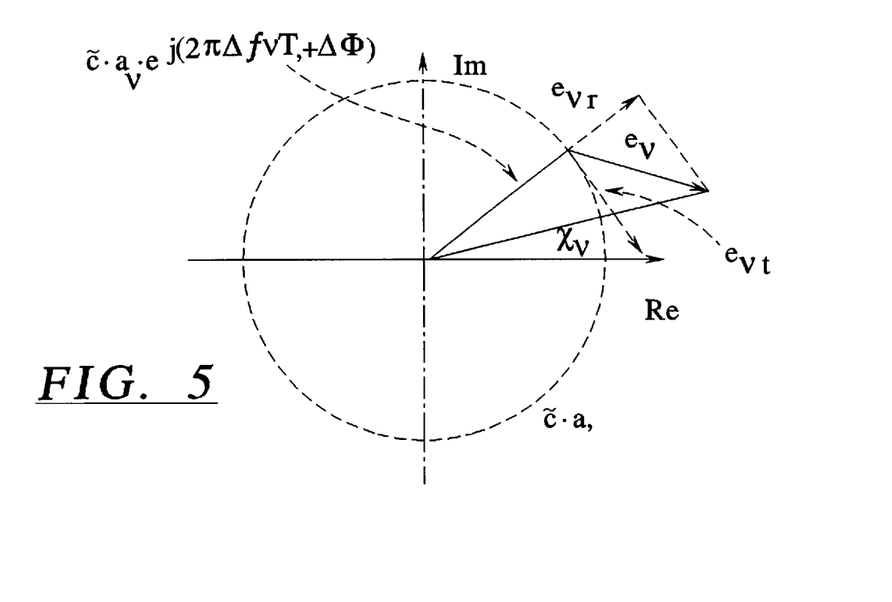
FIG. 5 illustrates a pointer diagram for an exemplary estimate.

The values $\Delta f$, $\Delta\Phi$ are not known and should not be introduced as test parameters for reasons of outlay. Since the maximum log-likelihood function is sought and, according to FIG. 5 given adequately great signal-to-noise ratio, the deviation $$e_v = x_v - \tilde{c}\ a_v e^{j(2\pi\Delta fvT_s+\Delta\Phi)}$$

is so small that the following approximation is allowed, for which $\Delta f$ and $\Delta\Phi$ need not be known:

$$|e_v|^2 = |e_{vr} + e_{vi}|^2 \quad (3)$$
$$\approx |e_{vr}|^2$$
$$\approx ||x_v| - |\tilde{c}a_v e^{j(2\pi\Delta fvT_s+\Delta\Phi)}|||^2$$
$$= ||x_v| - |\tilde{c}a_v|||^2$$

This approximation is necessary because $e_{vi}$ is likewise unknown because of the unknown frequency and phase offset.

A data-dependent estimation error does not arise due to this approximation since, given an increasing signal-to-noise ratio $E_s/N_0 \to \infty$, the sequence strives $$x_v \to \tilde{c}\ a_v e^{j(2\pi\Delta fvT_s+\Delta\Phi)}$$

Equation (3) thus has its minimum at $\tilde{c} = c$ and an estimation error does not arise:

By inserting Equation (3) into the log likelihood function, $$L(\tilde{c}) \approx \prod_v E_{a_v}\left\{ e^{-\frac{T_s}{N_0}||x_v|-|\tilde{c}a_v||^2} \right\}$$

derives.

What is referred to as the log likelihood function is obtained after logarithmization. This offers the advantage that no products need be formed, but sums. This simpler realization is permitted since the ln function rises strictly monotonously and, thus, the position of the maximum is not changed.

$$l(\tilde{c}) = \ln L(\tilde{c}) = \sum_v \ln(E_{a_v}\{e^{-\frac{T_s}{N_0}||x_v|-|\tilde{c}a_v||^2}\})$$

This expression is thus only dependent on the amount of the received symbols; the frequency and phase offset do not enter in due to the approximations that have been undertaken. The formation of the anticipation value over all M possible symbols of the symbol alphabet $a_v \in A_\alpha$ with the amounts $|A_\alpha|$ supplies $$l(\tilde{c}) = \sum_v \underbrace{\ln\left( \frac{1}{M}\sum_{\alpha=1}^{M} e^{-\frac{T_s}{N_0}||x_v|-\tilde{c}|A_\alpha|||^2} \right)}_{NL(|x_v|,\ \tilde{c})}$$

Figure 6:
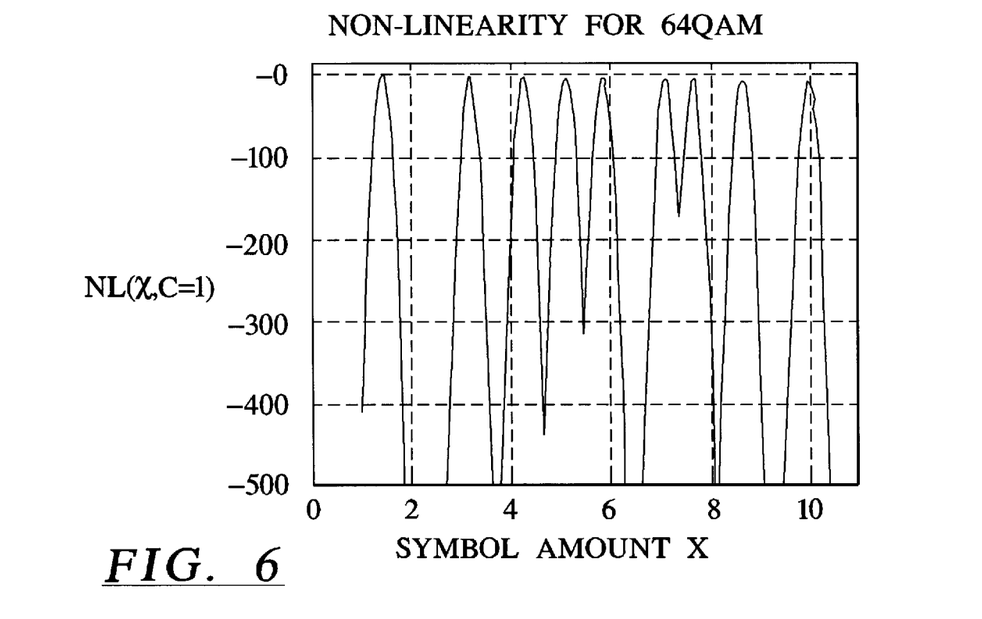
FIG. 6 illustrates the non-linearity in the calculation of the likelihood function for a 64 QAM for a signal-to-noise ratio $E_s/N_0=40$.

This non-linearity is shown by way of example in FIG. 6. The goal is then to simplify the non-linearity $NL(|x_v|, \tilde{c})$.

The following relationship exists between the term $T_s/N_0$, and the signal-to-noise ratio $E_s/N_0$:

$$\frac{T_s}{N_0} = \frac{T_s \cdot \overline{|a_v|^2}}{N_0 \cdot |a_v|^2} = \frac{E_s}{N_0} \cdot \frac{1}{|a_v|^2}$$

with $$\overline{|a_v|^2} = \frac{1}{M}\sum_{v=1}^{M}|A_\alpha|^2$$

Since the signal-to-noise ration is these observations represents a freely selectable constant, it is assumed below that the signal-to-noise ratio is $E_s/N_0 \gg 1$ and, according to FIG. 5, thus converges in the region of the maximum $|x_v| \to \tilde{c}|\hat{a}_v|$.

$$NL(|x_v|,\tilde{c}) = \ln\left( \frac{1}{M}\sum_{\alpha=1}^{M} e^{-\frac{E_s}{N_0}\cdot\frac{1}{|a_v|^2}||x_v|-\tilde{c}|A_\alpha|||^2} \right) \approx$$

$$\ln\left( \frac{n_\alpha}{M} e^{-\frac{E_s}{N_0}\cdot\frac{1}{|a_v|^2}||x_v|-\tilde{c}|\hat{a}_v|||^2} \right)$$

In the approximation, $n_\alpha$ indicates how often the amount $|A_\alpha|$ occurs in the sum over the M values of the symbol alphabet; moreover, every signal amount $|x_v|$ has an estimated ideal amount $\tilde{c}|\hat{a}_v|$ allocated to it.

The overlaps of the individual "lobes" in FIG. 6 are thus neglected for the implementation of the non-linearity since the following is valid for $|A_\alpha| \neq |a_v|$:

$$e^{-\frac{E_s}{N_0}\cdot\frac{1}{|a_v|^2}||x_v|-\tilde{c}|A_\alpha|||^2} \ll e^{-\frac{E_s}{N_0}\cdot\frac{1}{|a_v|^2}||x_v|-\tilde{c}|\hat{a}_v|||^2}$$

Figure 7:
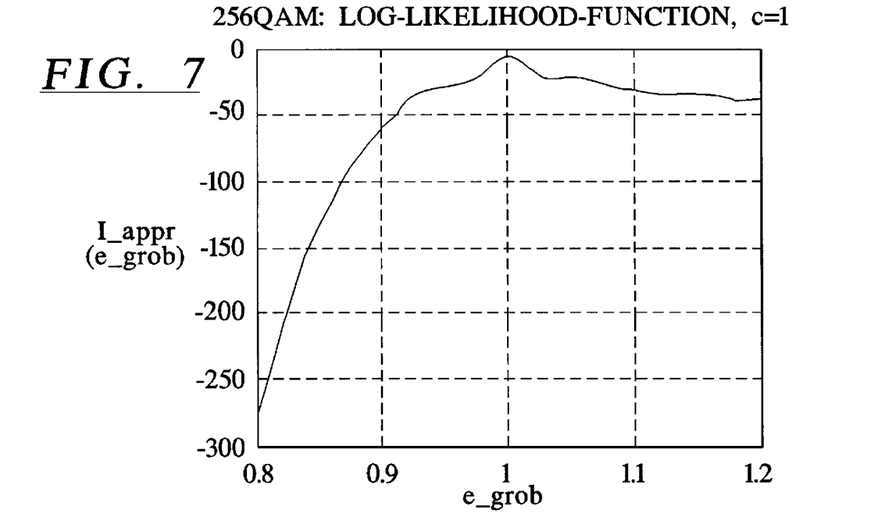
FIG. 7 illustrates the generation of the log-likelihood function according to Equation (4), with $T_{beab}=512 \cdot T_s$ and for a signal-to-noise ratio $E_s/N_0$=dB, for a 256 QAM.

For the approximation of the log likelihood function, $$\frac{E_s}{N_0}\cdot\frac{1}{|a_v|^2} := 1$$

is set. It has been shown in simulations that the weighting of the individual sum terms with the factors $n_\alpha/M$ yields no advantage; ultimately, thus, $$l_{appr}(\tilde{c}) = -\sum_{v} ||x_v| - \tilde{c}|\hat{a}_v||^2 \to \hat{c}_2 \quad (4)$$

is obtained for the approximation of the log likelihood function. Note that $|\hat{a}_v|$ must be re-estimated for every test parameter $\tilde{c}$ because many decision errors are made offside from the c to be estimated. A simulated example is shown in FIG. 7 for a 256QAM with a c=1 to be estimated.

In a loop $\tilde{c}$ is now varied over a range that must cover the maximum error of the pre-estimation. Given implemented simulations, this error lies at a maximum of 10% given short observation lengths, i.e., with the pre-estimation value $\hat{c}_1$ a variation range of $$\tilde{c} = 0.7 \cdot \hat{c}_1 \ldots 1.3 \cdot \hat{c}_1$$

easily suffices. The step width dc must be selected so fine corresponding to the modulation method that no incorrect amount decisions of the $|\hat{a}_v|$ occur insofar as possible. The following step widths thus derive as guidelines:

|        | Step width dc |
|--------|---------------|
| 16QAM  | 0.1           |
| 32QAM  | 0.05          |
| 64QAM  | 0.03          |
| 128QAM | 0.02          |
| 256QAM | 0.01          |

Figure 8:
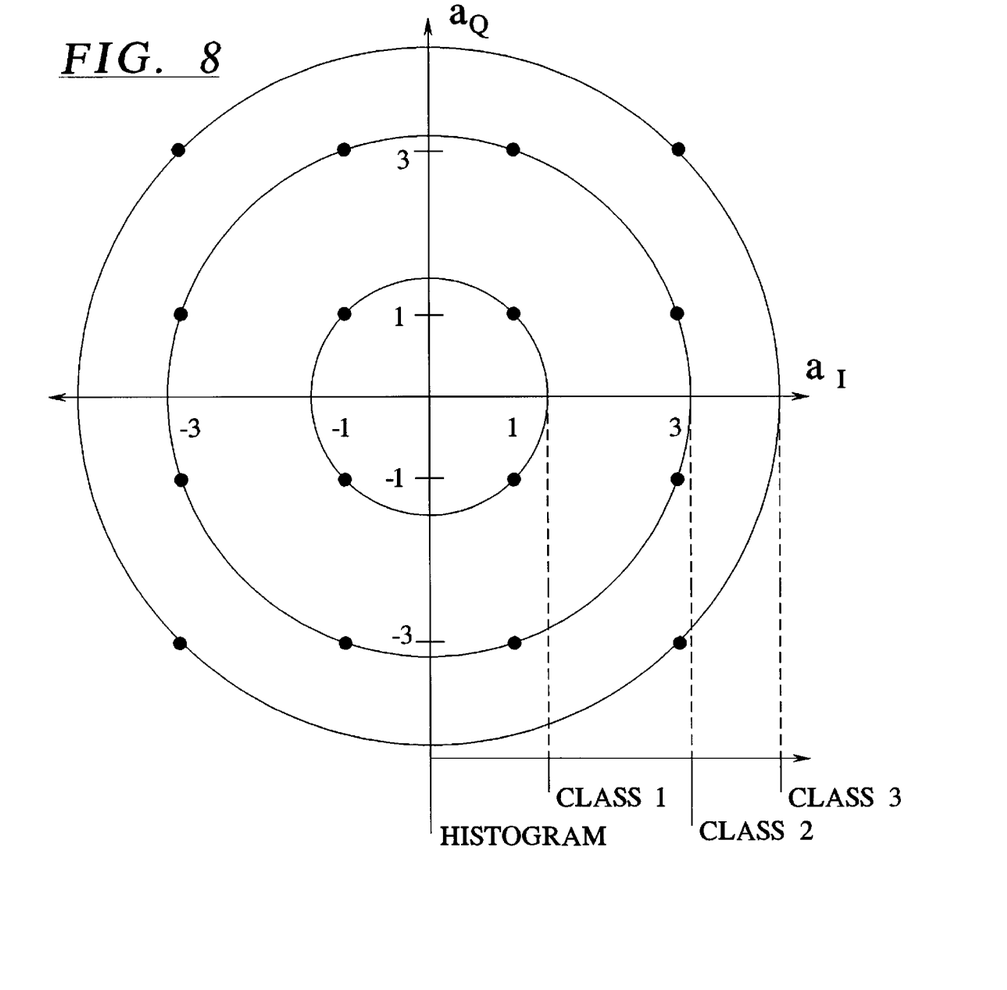
FIG. 8 illustrates a histogram for the symbol values showing the different class.

That factor $\hat{c}_2$ is selected that maximizes the log likelihood function Equation (4). This corresponds to the correlation of the histogram of the received symbol amounts with that of an ideal constellation in FIG. 8. The rough estimation value $\hat{c}_2$ is thus present.

Fine Estimation

The fine estimation works data-aided, i.e., after compensation with the previously estimated $\hat{c}_2$, the symbol amounts $|\hat{a}_v|$ are estimated first. Since no anticipation value is formed in the log likelihood function in the data-aided version in Equation (2), the log likelihood function $l_{appr}(\tilde{c})$ according to Equation (4) must be maximized in this case (without approximation). Since the individual $|\hat{a}_v|$ are estimated correctly with great probability given a known $\hat{c}_2$, the maximum can be found by calculation of the derivation:

$$\frac{\partial l_{appr}(\tilde{c})}{\partial \tilde{c}} = \sum_{v} 2[|x_v| - \tilde{c}|\hat{a}_v|] \cdot |\hat{a}_v| = 0 \Big|_{\tilde{c}=\hat{c}_3}$$

In the maximum of $l_{appr}(\tilde{c})$, $\hat{c}_3 = \tilde{c}$ is valid. The calculating rule of the fine estimation Equation (5) thus derives $$\hat{c}_3 = \frac{\sum_{v=0}^{N-1} |x_v| \cdot |\hat{a}_v|}{\sum_{v=0}^{N-1} |\hat{a}_v|^2}$$

The estimated values $|\hat{a}_v|$ are employed from the preceding rough estimation given the estimated dynamics value $\hat{c}_2$.

The expression can be easily checked. Given the assumption of an infinitely large signal-to-noise ratio $E_s/N_0 = \infty$ as $|x_v| \to a_v| \cdot c$, follows; the amount allocation then always ensues error-free with $|\hat{a}_v| = |a_v|$ and the fine estimation according to Equation (5) supplies the correct value according to $$\hat{c}_3 = \frac{\sum_{v=0}^{N-1} |a_v| \cdot c \cdot |a_v|}{\sum_{v=0}^{N-1} |a_v|^2} = c \cdot \frac{\sum_{v=0}^{N-1} |a_v|^2}{\sum_{v=0}^{N-1} |a_v|^2} = c \quad q.e.d.$$

The executive sequence for dynamics correction can thus be adapted to the modulation stage, the desired precision, the existing signal-to-noise power conditions as well as to the dataset length employed in that only the necessary stages of the estimation method are utilized.

The standard deviation of the estimated factor $\hat{c}$ $$\sigma_c = \sqrt{E\{\hat{c} - c\}^2}$$

is viewed as criterion for the quality of the dynamics correction.

Figure 9:
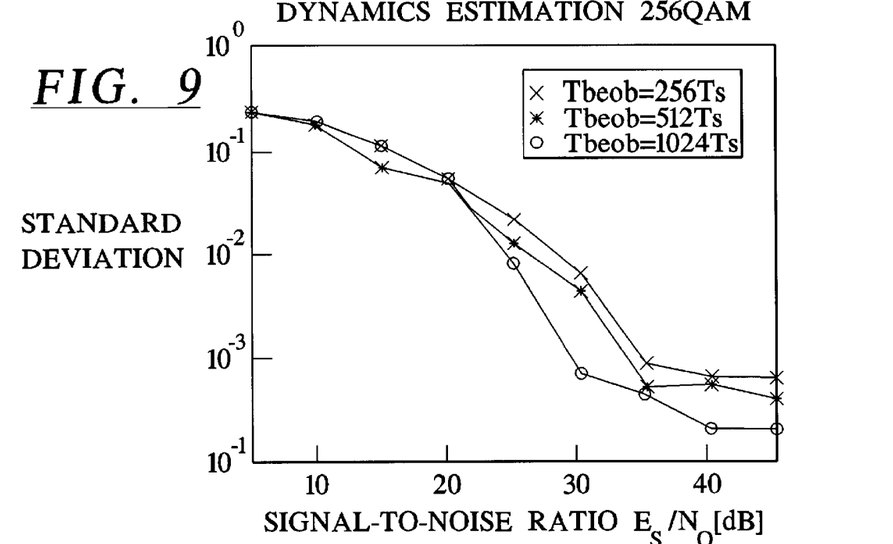
FIG. 9 shows the relationship between the signal-to-noise ratio and the standard deviation of the dynamic estimation for 256 QAM.

To this end, FIG. 9 shows the simulated standard deviation of the dynamics estimation of a 256 QAM (c=1 is set) for various observation lengths (=number of symbols N) given employment of all three stages.

$$|\hat{c} - c| \overset{!}{\leq} 0.01$$

must be valid for error-free symbol decision. On can see that, even given a small observation of only 256 symbols, the RMS error becomes so small beginning with a signal-to-noise ratio $E_s/N_0 \approx 30$ dB that no incorrect decisions occur any more given $\hat{a}_v$ due to the estimated dynamics error.

C. Carrier and Phase Synchronization

The carrier and phase synchronization is implemented according to the NDA method (Non Data Aided, i.e. without knowledge of the transmitted symbols $a_v$) based on the maximum likelihood theory The following DA method (Data-Aided, i.e. with the assistance of estimated symbols $\hat{a}_v$) is optional and reaches the theoretically possible error variance of the estimated frequency and phase. This method only has to be applied when maximum precision is required (for example, given a low symbol number N).

NDA Methods

The algorithm supplies estimated values $\Delta \hat{f}$ for the frequency offset and $\Delta \hat{\Phi}$ for the phase offset. By contrast to most methods hitherto known, the algorithm disclosed here is analytically realized in an "open loop" structure.

The likelihood function to be maximized for frequency and phase estimation reads (c=1 and $\epsilon$=0 set)

$$L(\Delta \tilde{f}, \Delta \tilde{\Phi}) = E_a \{e^{-\frac{1}{N_0} \int |r(t) - \tilde{s}(t) e^{j(2\pi \Delta \tilde{f} t + \Delta \tilde{\Phi})}|^2 dt}\}$$

whereby the individual signals are defined in FIG. 3. The expression $E_a\{\ \}$ describes the anticipation value with respect to the N transmitted symbols $a_v$. The values of the test parameters (generally identified with a tilde) $\Delta \tilde{f}$ and $\Delta \tilde{\Phi}$, at which the likelihood function becomes maximum are employed as an estimated value. In the MQAM transmission, M equally probable symbols $A_\alpha$ occur. After a longer intermediate calculation, the likelihood function can be simplified as $$L(\widetilde{\Delta f}, \widetilde{\Delta\Phi}) = const \cdot \prod_{\nu=0}^{N-1} \underbrace{\frac{1}{M} \sum_{\alpha=1}^{M} e^{-\frac{T_s}{N_0} \cdot |z_\nu - A_\alpha e^{j(2\pi\widetilde{\Delta f}T_s + \widetilde{\Delta\Phi})}|^2}}_{:=1}$$

with the constant const that is of no further interest. One can see that analog time curves no longer occur in the likelihood function but only the sampling sequence $Z_\nu$ (see FIG. 3) at the symbol times.

The logarithm function rises monotonously and thus does not modify the maximum. One obtains the likelihood function according to Equation (6)

$$l(\widetilde{\Delta f}, \widetilde{\Delta\Phi}) = \ln L(\widetilde{\Delta f}, \widetilde{\Delta\Phi}) \quad (6)$$

$$= \sum_{\nu=0}^{N-1} \ln \sum_{\alpha=1}^{M} \{ e^{-\frac{T_s}{N_0} \cdot |z_\nu - A_\alpha e^{j(2\pi\widetilde{\Delta f}T_s + \widetilde{\Delta\Phi})}|^2} \}$$

$$= \sum_{\nu=0}^{N-1} \ln \sum_{\alpha=1}^{M} \{ e^{-\frac{T_s}{N_0} \cdot |z_\nu e^{-j(2\pi\widetilde{\Delta f}T_s + \widetilde{\Delta\Phi})} - A_\alpha|^2} \}$$

For the following steps, the input sequence must be converted into polar coordinates according to Equation (7).

$$Z_\nu = |Z_\nu| \cdot e^{j\phi_\nu} \quad (7)$$

With definition of the non-linearity $$NL(z) = \ln \sum_{\alpha=1}^{M} \{ e^{-\frac{T_s}{N_0} \cdot |z - A_\alpha|^2} \}$$

with the general, complex variable z, the log likelihood function $$l(\widetilde{\Delta f}, \widetilde{\Delta\Phi}) = \sum_{\nu=0}^{N-1} NL(|z_\nu| \cdot e^{j(\phi_\nu - 2\pi\widetilde{\Delta f}T_s - \widetilde{\Delta\Phi})})$$

derives by insertion of Equation (8) into Equation (6).

The following is employed in order to arrive at an implementable approach: A Fourier series expansion of NL(z) is implemented with respect to the phase. With polar representation of the complex variables according to $$z = |z| \cdot e^{j\phi}$$

the non-linearity can be described by the Fourier series according to Equation (9)

$$NL(z) = \sum_{\beta = 0, \pm 4; \pm 8, \ldots} K_\beta(|z|) \cdot e^{j\beta\phi}$$

whereby the βth Fourier coefficient is only dependent on |z| and is calculated by insertion of the non-linearity in Equation (8) by Equation (10)

$$K_\beta(|z|) = \frac{1}{2\pi} \int_0^{2\pi} NL(z) e^{-j\beta\phi} d\phi \quad (10)$$

The following should be noted:
$K_\beta(|z|)$ is real because of the even phase symmetry
because of the $\pi/2$ phase symmetry, only every fourth coefficient $\beta = 0, \pm 4, \pm 8, \ldots$ is unequal to zero
the coefficients can be calculated with a FFT
$K_\beta(|z|)$ are calculated in advance and placed in a table in an adequately small $\Delta|z|$-grid. It was shown in the course of the investigations that the coefficients $K_4(|z|)$ suffice only at the ideal symbol amounts $|z| = A_\alpha$.

The log likelihood function can thus be written:

$$l(\widetilde{\Delta f}, \widetilde{\Delta\Phi}) = Re \left\{ \sum_{\nu=0}^{N-1} K_0(|z_\nu|) \cdot e^{j0(\phi_\nu - 2\pi\widetilde{\Delta f}T_s - \widetilde{\Delta\Phi})} \leftarrow \beta = 0 + \right.$$

$$2 \cdot \sum_{\nu=0}^{N-1} K_4(|z_\nu|) \cdot e^{j4(\phi_\nu - 2\pi\widetilde{\Delta f}T_s - \widetilde{\Delta\Phi})} \leftarrow \beta = \pm 4 +$$

$$\left. 2 \cdot \sum_{\nu=0}^{N-1} K_8(|z_\nu|) \cdot e^{j8(\phi_\nu - 2\pi\widetilde{\Delta f}T_s - \widetilde{\Delta\Phi})} \leftarrow \beta = \pm 8 + \ldots \right\} \quad (11)$$

The first sum expression is irrelevant for the frequency and phase estimation since this is independent of the parameters to be estimated.

In a first approximation according to Equation (12), only the fourth Fourier coefficient $K_4(|z|)$:

$$l(\widetilde{\Delta f}, \widetilde{\Delta\Phi}) = \underbrace{2}_{\substack{\text{irrelevant} \\ \rightarrow \text{weglassen}}} \cdot Re \left\{ \sum_{\nu=0}^{N-1} K_4(|z_\nu|) \cdot e^{j4(\phi_\nu - 2\pi\widetilde{\Delta f}T_s - \widetilde{\Delta\Phi})} \right\} \quad (12)$$

In the region of the maximum of Equation (12), $Re\{\ldots\} \approx |\ldots|$, approximately applies because the overall pointer lies almost exactly on the positive real part axis. In Equation (13), the simplification $$l(\widetilde{\Delta f}) = \left| \sum_{\nu=0}^{N-1} K_4(|z_\nu|) \cdot e^{j4(\phi_\nu - 2\pi\widetilde{\Delta f}T_s - \widetilde{\Delta\Phi})} \right| \quad (13)$$

$$= \left| \sum_{\nu=0}^{N-1} K_4(|z_\nu|) \cdot e^{j4(\phi_\nu - 2\pi\widetilde{\Delta f}T_s)} \right|$$

is thus permitted. One thus obtains an expression that is independent of the test phase $\Delta\phi$. The two-dimensional estimation problem has thus been reduced to two one-dimensional ones. The sought maximum is not shifted by squaring of Equation (13). An analytical further-development is possible due to this squaring.

$$l(\widetilde{\Delta f})^2 = \left| \sum_{\nu=0}^{N-1} K_4(|z_\nu|) \cdot e^{j4(\phi_\nu - 2\pi\widetilde{\Delta f}T_s)} \right|^2 \quad (14)$$

must thus be maximized. After the substitution according to Equation (14), $$k(\nu) = K_4(|z_\nu|) \cdot e^{j4\phi_\nu} \quad (14)$$

is obtained with $|x|^2 = x \cdot x^*$ $$l(\tilde{\Delta f})^2 = \sum_{\mu=0}^{N-1}\sum_{\nu=0}^{N-1} k(\nu)k^*(\mu) \cdot e^{j4(\nu-\mu)2\pi\tilde{\Delta f}T_s} \quad (15)$$

$$= \sum_{\mu=0}^{N-1} |k(\mu)|^2 + 2 \cdot$$

$$Re\left\{ \underbrace{\sum_{\mu=0}^{N-1}\sum_{\nu=0}^{N-1} k(\nu)k^*(\nu-\mu) \cdot e^{j4\nu-\mu 2\pi\tilde{\Delta f}T_s}}_{\text{sum}(\mu)} \right\}$$

$$= \underbrace{\sum_{\mu=0}^{N-1} |k(\mu)|^2}_{\text{not}} + 2 \cdot$$

$$Re\left\{ \sum_{\mu=1}^{N-1} \text{sum}(\mu) \cdot e^{-j4\mu 2\pi\tilde{\Delta f}T_s} \right\}$$

The first term is independent of $\Delta f$ and therefore need not be considered. Using the polar representation according to Equation (16)

$$\text{sum}(\mu) = |\text{sum}(\mu)| \cdot e^{j\beta(\mu)} \quad (16)$$

the real part of the sum expression in Equation (17) yields $$l'(\tilde{\Delta f})^2 = 2 \cdot \left\{ \sum_{\mu=1}^{N-1} |\text{sum}(\mu)| \cdot \cos(\beta(\mu) - 4\mu 2\pi\tilde{\Delta f}T_s) \right\} \quad (17)$$

Given extremely small arguments, the approximation expression $$\cos(\xi) \approx 1 - \frac{\xi^2}{2}$$

is valid for the cosine function.

Since the cos argument of Equation (17) is small in the region of the estimated value $\hat{\Delta f}$, this approximation can be allowed. One obtains Equation (18)

$$l'(\tilde{\Delta f})^2 = 2 \cdot \left\{ \sum_{\mu=1}^{N-1} |\text{sum}(\mu)| \cdot \left[ 1 - \frac{(\beta_u(\mu) - 4\mu 2\pi\tilde{\Delta f}T_s)^2}{2} \right] \right\} \quad (18)$$

Figure 10:
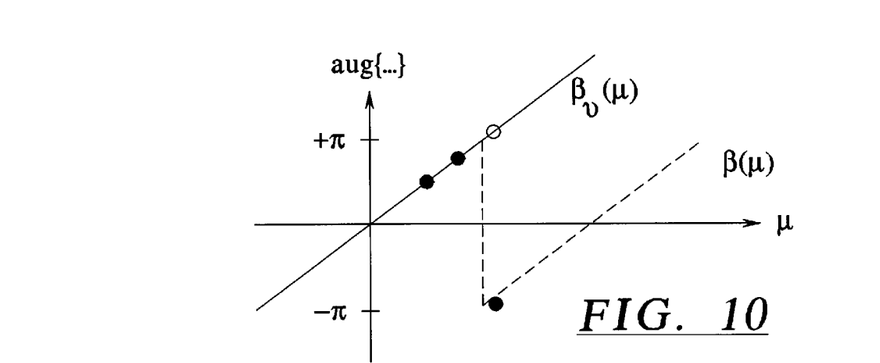
FIG. 10 illustrates the calculation of continuous phase values.

Note that, due to the periodicity of the cos function, the phase $\beta(\mu)$ in Equation (17) is still allowed to have discontinuities, whereas these discontinuities dare no longer occur in the approximation in Equation (18), for which reason the "unwrapped phase" $\beta_u(\mu)$ is also defined in the approximation. This situation is illustrated in FIG. 10.

Subsequently, the first derivative of this expression according to $\Delta f$, that must become zero in the maximum of the log likelihood function (i.e. at the sought location $\Delta f = \hat{\Delta f}$)

$$\left. \frac{\partial l'(\tilde{\Delta f})^2}{\partial \tilde{\Delta f}} \right|_{\tilde{\Delta f}=\hat{\Delta f}} \stackrel{!}{=} 0$$

is inserted:

$$4 \cdot \sum_{\mu=1}^{N-1} |\text{sum}(\mu)| \cdot (\beta_u(\mu) - 4\mu 2\pi\hat{\Delta f}T_s) \cdot 4\mu T_s \stackrel{!}{=} 0$$

Solved for $\Delta f$ one ultimately obtains the analytical estimated value for the frequency offset according to Equation (19)

$$\hat{\Delta f} = \frac{1}{2\pi} \cdot \frac{\sum_{\mu=1}^{N_{sum}-1} |\text{sum}(\mu)| \cdot \beta_u(\mu) \cdot \mu}{4 \cdot \sum_{\mu=1}^{N_{sum}-1} |\text{sum}(\mu)| \cdot \mu^2 T_s} \quad (19)$$

In the estimating, $N_{sum}$ are employed generalized, this yet to be discussed below. The sought frequency offset thus derives by the calculation of a linear, amount-weighted regression.

Figure 11:
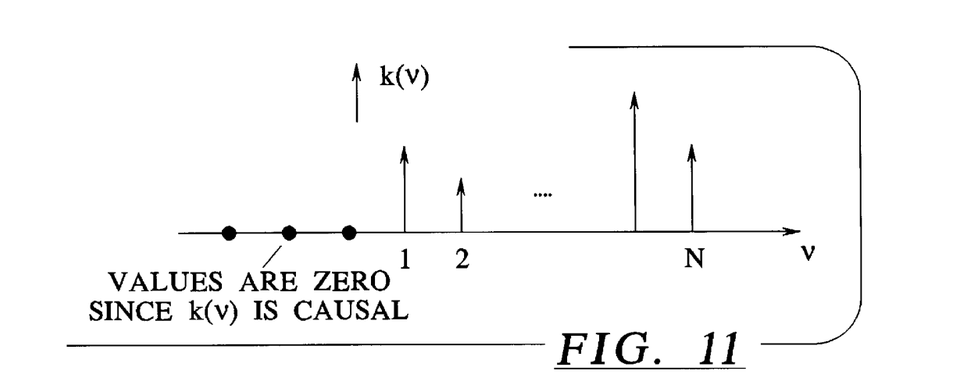
FIG. 11 illustrates the calculation of summation expressions of sum($\mu$).

The sum expression $\text{sum}(\mu)$ of Equation (15)

$$\text{sum}(\mu) = \sum_{\nu=\mu}^{N-1} k(\nu) \cdot k^*(\nu-\mu)$$

can be very efficiently calculated with the assistance of a FFT. Since $k(\nu)$ is causal according to Equation (11) (see FIG. 11), the lower summation limit can be set to zero, and one obtains $$\text{sum}(\mu) = \sum_{\nu=0}^{N-1} k(\nu) \cdot k^*(\nu-\mu)$$

$$= k(\mu)*k^*(-\mu)$$

When a z-transformation is carried out at this expression, $$\text{sum}(\mu) = k(\mu)*k^*(-\mu)$$

$$\updownarrow$$

$$SUM(e^{j\Omega}) = K(e^{j\Omega}) \cdot K^*(e^{j\Omega}) = |K(e^{j\Omega})|^2$$

$$\updownarrow$$

$$\text{sum}(\mu)$$

derives.

The cyclical convolution of the FFT corresponds to the linear convolution of the z-transformation when $$N_{FFT} \stackrel{!}{\geq} 2N$$

is valid for the FFT length.

To that end, the corresponding vectors are filled with zeros before the transformation. The sum expression can thus be calculated according to the following procedure in Equation (20):

$$\begin{array}{cccc} FFT \text{ with} & & IFFT & \\ k(\nu) & \rightarrow K(e^{j\Omega}) & \rightarrow |K(e^{j\Omega})| & \rightarrow \text{sum}(\mu) \\ N_{FFT} \geq 2N & & & \end{array} \quad (20)$$

Figure 12:
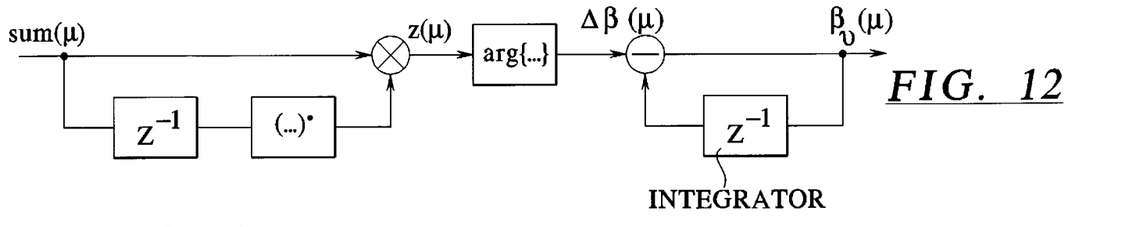
FIG. 12 is a block diagram illustrating the calculation of the continuous phase.

In order to generate the "unwrapped" phase of the sum terms $\text{sum}(\mu)$, the phase difference $\Delta\beta(\mu) \in [-\pi, +\pi]$ of two successive elements are first determined; these phase difference values are then summed up. The block circuit diagram for the calculation of the continuous phase is shown in FIG. 12.

Figures 13, 18, 19:
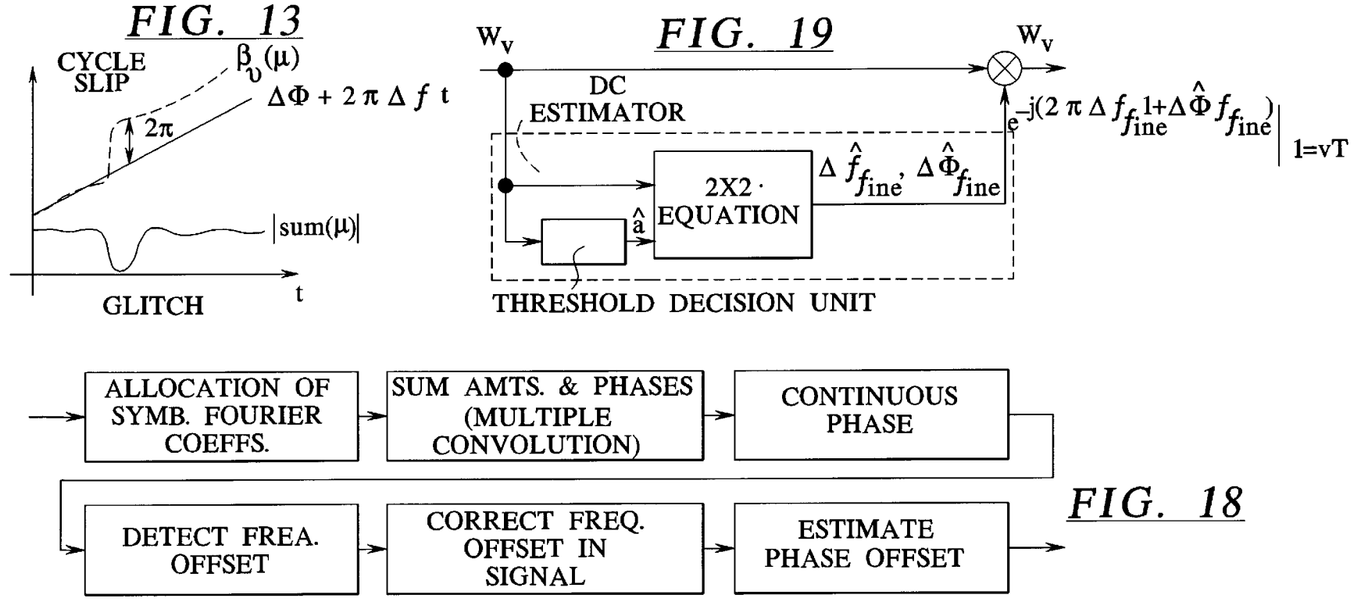
FIG. 13 illustrates the phenomenon of "cycle slips."
FIG. 18 is a flowchart summarizing the inventive method.
FIG. 19 is a block diagram illustrating the estimated symbol sequence in the DA method.

In an implementation in practice, a problem is that data-dependent errors can lead to inaccuracies sum($\mu$) which, given the calculation of the continuous phase curve $\beta_U(\mu)$, can lead to an occurrence of undesired $2\pi$ "cycle slips" as illustrated in FIG. 13. The linear regression and the estimated value $\Delta \hat{f}$ discontinuities can thus occur in the identified, continuous phase curve given such inaccuracies. The estimated phase curve then deviates substantially from the ideal phase curve.

Strategies for detecting cycle slips and subsequently removing the $2\pi$ discontinuities in the phase curve $\beta(\mu)$, prove of little use and too imprecise. The better solution is to avoid the cycle slips. This is achieved in that the sequence k(v) in the sum expression sum($\mu$) is convoluted with itself not only once but repeatedly, this corresponding to an enhanced exponentiation in the frequency domain and being easy to calculate. As a result, a more pronounced averaging effect occurs and glitches are avoided. The procedure of Equation (20) is thus expanded by Equation (21), whereby the parameter pot indicates the exponentiation factor.

$$k(v) \xrightarrow[N_{FFT} \geq \text{Pot} \cdot N]{FFT \text{ with}} K(e^{j\Omega}) \to |K(e^{j\Omega})|^{pot} \xrightarrow{IFFT} \text{sum}(\mu) \tag{21}$$

The investigations have shown that pot$\leq 5$ is adequate even given a greatly disturbed 256 QAM; higher powers yield no further advantage.

This method for the suppression of "cycle slips" is, I believe, still unknown and a constituent part of the patent claim. This method for avoiding "cycle slips" is not limited to the MQAM synchronization and should be globally patented. With this method, namely, the frequency $\Delta f$ of a generalized sequence k(v) with extreme glitches (modeled by sequence glitch (v)) and extreme disturbances (modeled by noise sequence n(v)) can be estimated with high precision according to Equation (22).

$$k(v) = \text{glitch}(v) \cdot e^{j(\Delta \omega v T_a + \Delta \phi)} + n(v) \tag{22}$$

The estimation variance approximately achieves the theoretically possible Craner-Rao limit. With the phase estimation described below, further, the phase$\Delta \Phi$ can also be estimated.

Figure 14:
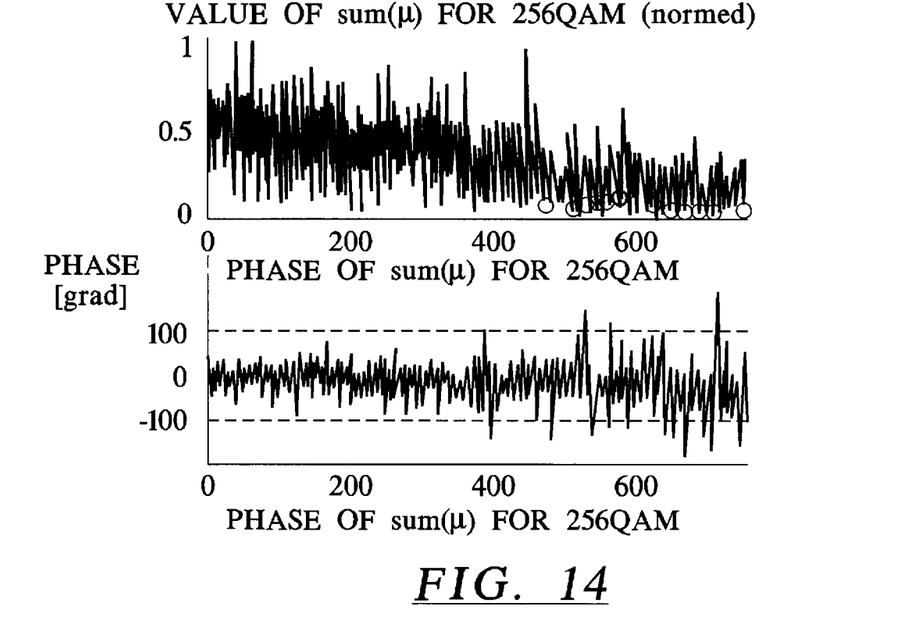
FIG. 14 shows sum($\mu$) for 256 QAM (normalized) relative to the phase, for pot=2.
Figure 15:
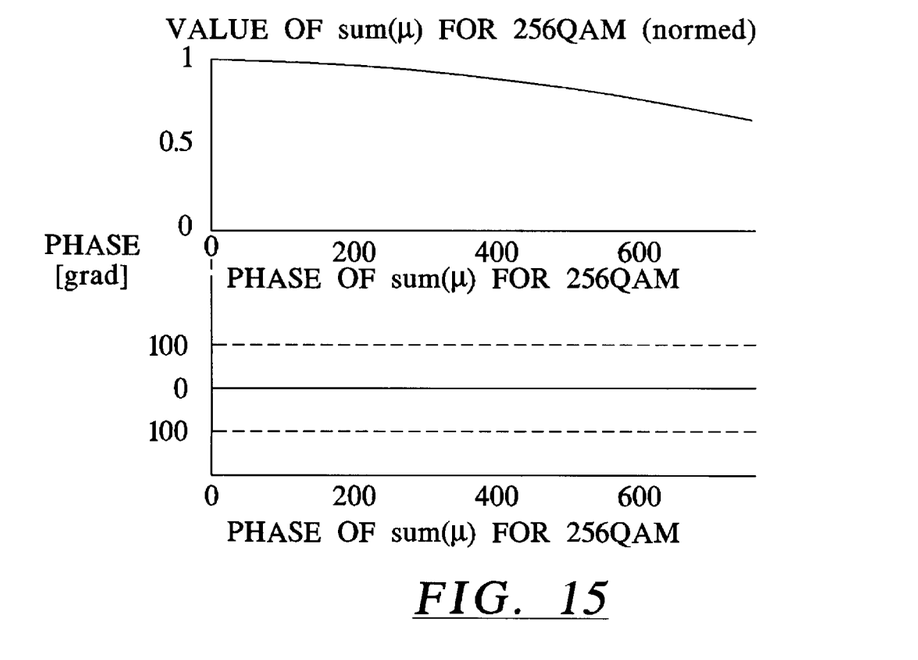
FIG. 15 shows sum($\mu$) for 256 QAM (normalized) relative to the phase, for pot=5.

The performance capability is demonstrated by FIGS. 14 and 15. In both FIGS., sum(v) is shown for a 256QAM with an observation length over N=1024 symbols given extreme disturbance of $E_s/N_0$=15 dB at $\Delta f = \Delta \Phi = 0$.

In FIG. 14, pot=2 was selected and in FIG. 15 pot=5 was selected. As one can see from a comparison of the two Figures, the cycle slips disappear due to the averaging effect at the higher power because signal glitches no longer occur in sum($\mu$) and, thus, great phase deviations from the rated phase zero (since $\Delta f = \Delta \Phi = 0$) no longer occur. This method thus also proves extremely rugged even given low signal-to-noise ratios.

Further, the entire sequence sum($\mu$) need not be utilized for the estimating; rather, $$N_{sum} \leq 0.75 \cdot N$$

sum values suffice in Equation (19) (N is the observation length in symbol periods); more sum values no longer improve the estimation result. Even given a significantly smaller $N_{sum}$, very similar error variances are obtained; $N_{SUM}$=0.25·N was employed in the simulations.

After an estimated value $\Delta \hat{f}$ has been calculated, the estimated frequency offset according to Equation (19) must be introduced before the subsequent estimation of the phase offset$\Delta \hat{\Phi}$ and a one-dimensional estimation problem for the phase determination is again obtained:

$$l(\Delta \tilde{\Phi}) = Re \left\{ \underbrace{\sum_{v=0}^{N-1} K_4(|x_v|) \cdot e^{j4\Phi_v} \cdot e^{-j4(2\pi \Delta \hat{f} v T_s + \Delta \tilde{\Phi})}}_{k(v)} \right\}$$

$$= Re \left\{ \underbrace{\frac{1}{4} \sum_{v=0}^{N-1} k(v) \cdot e^{-j4 \cdot 2\pi \Delta \hat{f} v T_s} \cdot e^{-j4\Delta \tilde{\Phi}}}_{ges} \right\}$$

This expression is maximum when the overall expression ges is real in the equation. The phase offset can thus be formed according to Equation (23) via an argument formation:

$$\Delta \hat{\Phi} = \frac{1}{4} \arg \left\{ \sum_{v=0}^{N-1} k(v) \cdot e^{-j4 \cdot 2\pi \Delta \hat{f} v T_s} \right\} \tag{23}$$

Due to $\pi/2$ rotational symmetry of the symbol alphabet, of course, only $\Delta \Phi \bmod \pi/2$ can be determined.

For evaluating the synchronization, the standard deviations of the results $\Delta \hat{f}$ to $\Delta \hat{\Phi}$ are utilized, referred to the respective reference values:

$$\sigma_f = \sqrt{E\left\{\left(\frac{\Delta \hat{f}}{f_s} - \frac{\Delta f}{f_s}\right)^2\right\}}$$

$$\sigma_\Phi = \sqrt{E\{(\Delta \hat{\Phi} - \Delta \Phi)^2\}}$$

Figure 16:
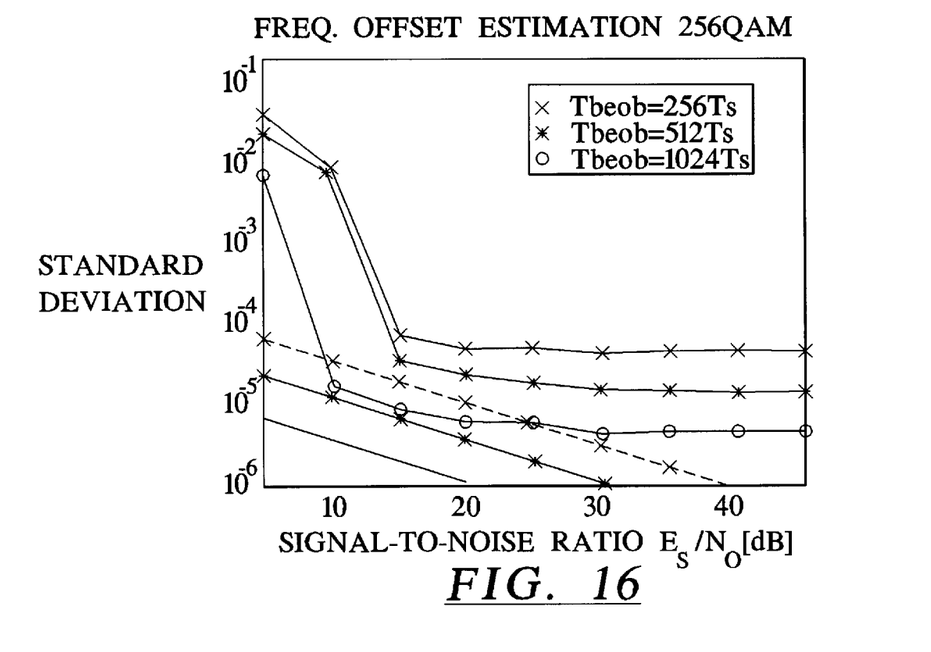
FIG. 16 illustrates the frequency offset estimation for 256 QAM for pot=5.
Figure 17:
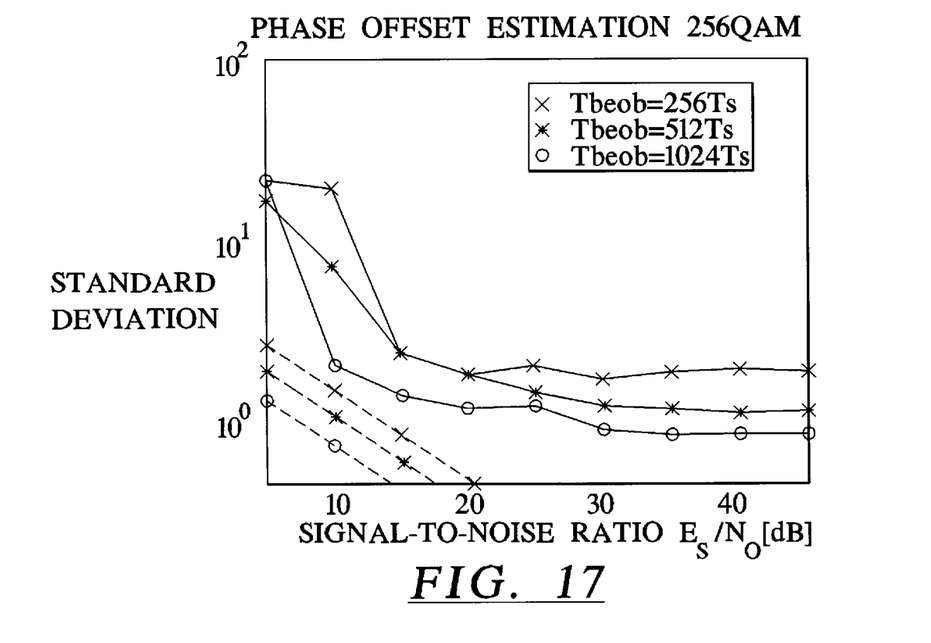
FIG. 17 illustrates the phase offset estimation for 256 QAM for pot=5.

FIGS. 16 and 17 show the simulation results for various observation lengths. One can see that a stagnation exists for $E_s/N_0$>15 dB due to the data-dependent estimation error because only the first Fourier coefficient is employed according to Equation (12). If one would like to reach the theoretically possible, broken-line limits, the DA estimator described in the next chapter must follow.

In summary, it can be stated: Up to now, no method was known with which the frequency and phase offset in high-level MQAM modulation can be analytically calculated without knowledge of the symbols. The execution is summarized again in FIG. 18. In order to arrive at a method that can be numerically handled, a Fourier series expansion of the non-linearity in the likelihood function is undertaken. It proves adequate to employ only one Fourier coefficient of the series. As a result thereof, it becomes possible to calculate the frequency offset and then the phase offset in two steps with an open loop method with the assistance of phase regression. Further, the problem of what are referred to as cycle slips ($2\pi$ phase discontinuities in the calculation of the continuous unwrapped phase) must be solved for the phase regression, these occurring due to amount glitches of the complex pointer. These cycle slips are efficiently suppressed by multiple convolution operation, i.e. the amount fluctuations are clearly reduced with every convolution. As a result of the amount-weighted phase regression, the estimated value of the frequency offset is subsequently obtained. Next, the reception signal is compensated with the estimated frequency offset and the output dataset is employed for estimating the phase offset. The estimation of the phase offset is again undertaken using the first Fourier coefficient of the likelihood function. Subsequently, an improved DA estimation can be optionally implemented.

DA Method

DA methods for phase estimation have already been discussed in the literature, for example for the QPSK modulation method (F. M. Gardner: Demodulator Reference Recovery Techniques suited for Digital Implementation, ESA Report, 1988). However, only a phase estimation and not a frequency and phase estimation forms the basis. The method known from the literature has been expanded, so that a frequency and phase estimation is possible.

The estimated symbol sequence must be present in the DA method. According to FIG. 19, the symbols $\hat{a}_v$ from the frequency and phase-compensated sequence $w_v$ must first be estimated be a threshold decision unit. The fine estimate values $\Delta \tilde{f}_{fine}$ and $\Delta \tilde{\Phi}_{fine}$ that still remain are identified by maximization of the log likelihood function $$l(\Delta \tilde{f}_{fine}, \Delta \tilde{\Phi}_{fine}) = -\sum_{v=0}^{N-1} |w_v - \hat{a}_v \cdot e^{j(2\pi \Delta \tilde{f}_{fine} vT_s + \Delta \tilde{\Phi}_{fine})}|^2 \quad (24)$$

$$= const + 2 \cdot Re \left\{ \sum_{v=0}^{N-1} \underbrace{w_v \cdot \hat{a}_v^*}_{po\,int_v} \cdot e^{j(2\pi \Delta \tilde{f}_{fine} vT_s + \Delta \tilde{\Phi}_{fine})} \right\}$$

The pointer $$point_v = w_v \cdot \hat{a}_v^* \quad (25)$$

defined in Equation (24) is rotated back onto the real axis part given the correct estimated frequency and phase value. It is recommendable to employ polar representation for the further derivation according to Equation (26)

$$point_v = |point_v| \cdot e^{j\alpha_v} \quad (26)$$

By insertion into Equation (24), one obtains $$l(\Delta \tilde{f}_{fine}, \Delta \tilde{\Phi}_{fine}) = const + 2 \cdot Re \left\{ \sum_{v=0}^{N-1} |zeig_v| \cdot e^{j(\alpha_v - 2\pi \Delta \tilde{f}_{fine} vT_s - \Delta \tilde{\Phi}_{fine})} \right\}$$

$$= const + 2 \cdot \sum_{v=0}^{N-1} |zeig_v| \cdot \cos(\alpha_v - 2\pi \Delta \tilde{f}_{fine} \cdot vT_s - \Delta \tilde{\Phi}_{fine})$$

The cos argument is very small in the region of the maximum and the approximation $$\cos(\xi) \approx 1 - \frac{\xi^2}{2}$$

is therefore allowed. Note that the phase only amounts to a few degrees (see FIG. 17) because of the NDA estimation that is already very good. By contrast to the NDA method, consequently, an unwrapped phase also need not be calculated given application of this approximation.

$$l(\Delta \tilde{f}_{fine}, \Delta \tilde{\Phi}_{fine}) = const + 2 \cdot \sum_{v=0}^{N-1} |zeig_v| \cdot$$

-continued $$\left[ 1 - \frac{(\alpha_v - 2\pi \Delta \hat{f}_{fine} \cdot vT_s - \Delta \hat{\Phi}_{fine})^2}{2} \right]$$

thus derives.

In order to determine the maximum of this expression, the partial derivations of $\Delta \hat{f}_{fine}$ and $\Delta \hat{\Phi}_{fine}$ are first calculated and these are set equal to zero.

$$\frac{\delta}{\delta \Delta \hat{f}_{fein}} l(\Delta \hat{f}_{fein}, \Delta \hat{\Phi}_{fine}) = 2 \cdot \sum_{v=0}^{N-1} |zeig_v| \cdot$$

$$[\alpha_v - 2\pi \Delta \hat{f}_{fine} \cdot vT_s - \Delta \hat{\Phi}_{fine}] \cdot 2\pi vT_s \overset{!}{=} 0$$

-continued $$\frac{\delta}{\delta \Delta \hat{\Phi}_{fine}} l(\Delta \hat{f}_{fein}, \Delta \hat{\Phi}_{fine}) = 2 \cdot \sum_{v=0}^{N-1} |zeig_v| \cdot$$

$$[\alpha_v - 2\pi \Delta \hat{f}_{fine} \cdot vT_s - \Delta \hat{\Phi}_{fine}] \overset{!}{=} 0$$

In matrix form, the equation system $$\underbrace{\begin{bmatrix} \sum_{v=0}^{N-1} |zeig_v| \cdot v^2 T_s & \sum_{v=0}^{N-1} |zeig_v| \cdot v \\ \sum_{v=0}^{N-1} |zeig_v| \cdot v & \sum_{v=0}^{N-1} |zeig_v| \end{bmatrix}}_{A} \cdot \underbrace{\begin{bmatrix} 2\pi \Delta \hat{f}_{fine} \\ \Delta \hat{\Phi}_{fine} \end{bmatrix}}_{b} =$$

$$\begin{bmatrix} \sum_{\nu=0}^{N-1} |zeig_\nu| \cdot \alpha_\nu \cdot \nu \\ \sum_{\nu=0}^{N-1} |zeig_\nu| \cdot \alpha_\nu \end{bmatrix} \quad b$$

derives.

By solving for the phase and frequency offset, the sought solution is obtained in Equation (27).

$$\begin{bmatrix} 2\pi\Delta\hat{f}_{fine} \\ \Delta\hat{\Phi}_{fine} \end{bmatrix} = A^{-1} \cdot b \qquad (27)$$

FIG. 19 shows the block circuit diagram of the DA method.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for demodulating higher-level MQAM signals produced by transmitting symbols in a data sequence using a baseband signal, without knowledge of the transmitted symbols, comprising:

(a) by sampling the baseband signal with a clock frequency corresponding to the MQAM signal;

(b) estimating a clock phase error and compensating a corresponding time shift of the baseband signal by interpolation with the estimated clock phase error; and (c) calculating a carrier frequency deviation and a carrier phase deviation feedback-free according to the principle of the maximum likelihood theory using a procedure selected from the group consisting of Fourier transformation and by convolution in the time domain and, thereby compensating the data sequence.

2. A method according to claim 1, comprising following step (b), sampling a ratio of a calculated average of symbol amount values sampled at symbol times to a statistical average of symbol amount values of the MQAM modulation as a dynamics error and employing said calculated average for dynamics compensation of the sampled data sequence as a dynamics pre-estimation.

3. A method according to claim 2, comprising following the dynamics pre-estimation, calculating dynamics of the data sequence by correlation of a relative frequency of occurrence of the sampled symbol amount values with a statistical distribution density function of the symbol amounts according to said principle of the maximum likelihood theory as a dynamics rough estimation.

4. A method according to claim 3, comprising following the dynamics rough estimation, conducting a dynamics fine estimation using said maximum likelihood theory.

5. A method according to claim 1, comprising converting said data sequence into polar coordinate representation and compensating the data sequence with respect to clock phase and dynamics to obtain a compensated data sequence and converting said compensated data sequence into a new data sequence by multiplication by Fourier coefficients of a non-linearity arising from the maximum likelihood theory, said Fourier coefficients being stored in a table; forming a sum value from said new sequence by Fourier transformation, exponentiating an amount of this Fourier transformation to obtain an exponentiation result and subsequently inversely Fourier transforming said exponentiation result, calculating a phase without $2\pi$ phase discontinuities from said sum value after conversion into polar coordinate representation, and calculating a frequency offset and a phase offset from said phase with which the data sequence is then compensated.

6. A method according to claim 5, comprising following the compensation of the clock phase, dynamics, frequency and phase, rotating the data sequence is back in a direction of the origin by conjugate-complex multiplication with the estimated symbol sequence to obtain a multiplication result, converting said multiplication result into polar coordinate representation and, after solving a following equation system, acquiring fine estimation values for the carrier frequency offset and carrier phase offset, and fine-compensating said data sequence.

* * * * *